Aug. 22, 1939.  P. S. DICKEY  2,170,347
CONTROL SYSTEM
Original Filed Dec. 18, 1935   5 Sheets—Sheet 4

INVENTOR.
PAUL S. DICKEY
BY
Raymond W. Jenkins
ATTORNEY.

Aug. 22, 1939.    P. S. DICKEY    2,170,347
CONTROL SYSTEM
Original Filed Dec. 18, 1935    5 Sheets-Sheet 5

INVENTOR.
PAUL S. DICKEY
BY
Raymond W. Jenkins
ATTORNEY.

Patented Aug. 22, 1939

2,170,347

UNITED STATES PATENT OFFICE 2,170,347

CONTROL SYSTEM

Paul S. Dickey, Cleveland, Ohio, assignor to Bailey Meter Company, a corporation of Delaware Application December 18, 1935, Serial No. 55,024
Renewed March 4, 1939

17 Claims. (Cl. 122—448)

This invention relates to a method and means for operating and controlling the operation of vapor generators; particularly vapor generators of the drumless, forced flow type, having a fluid flow path including one or more long small-bore tubes, in which the flow in the path is initiated by the entrance of liquid under pressure at one end, and the exit of vapor only at the other end, characterized by an inflow of liquid normally greater than the outflow of vapor, the difference being diverted from the path intermediate the ends thereof.

Such a vapor generator having small liquid storage and operated with wide range combustion devices forms a combination rendering practical extremely high heat release rates with the consequent ability to economically handle practically instantaneous load changes from minimum to maximum, and vice versa, without heavy standby expense, and is particularly suitable for operating conditions such as locomotive service, where load variations are of a wide range and are required to be met substantially instantaneously.

The generator has a minimum liquid storage capacity with a maximum heat absorbing surface so disposed and arranged as to be substantially instantaneously responsive to rapid changes and wide diversities in heat release rate in the furnace. The heat absorbing surface is arranged in relation to the path of the products of combustion and radiant heating so that the entering liquid is received at the cooler end of the path. Further, the vapor generator insofar as the passage of combustion gases is concerned has a continuously increasing resistance to gas flow throughout the length of the passage.

The heat absorbing surface, or flow path for the working medium, is comprised of one or more long small-bore tubes with an enlargement, preferably at the end of the generating section, which acts as a separator to divide liquid and vapor. The vapor is then passed through a superheater, while the excess liquid carried through the tubes for the purpose of wetness and preventing scale deposit, is diverted out of the separator under regulated conditions, as will be hereinafter set forth. From the separator there is a normal continuous and an additional regulated spillover of diversion of a part of the liquid entering the economizer under pressure, so that there is always being fed to and through the economizer and vapor generating sections more liquid than can be converted into vapor in a single passage therethrough, although the proportion of such excess liquid represents but a small part of the total volume of fluid passing through the vapor generator and is at most times only sufficient to insure tube wetness and to carry off scale forming material.

In vapor generators of the character mentioned having small liquid and heat storage with high heat release capabilities, the liquid inflow must of necessity be continuous and at all times proportioned to the vapor outflow, at the same time taking into account the desired diversion of excess liquid from the flow path. Furthermore to accomplish the wide range in heat release with substantially instantaneous response and to perform the combustion process efficiently, a method and means for operating such a vapor generator in accordance with varying conditions must be provided.

A principal object of the invention is to so control the operation of such a vapor generator as to satisfactorily produce wide changes in heat release rate with great speed, through proper regulation of liquid inflow and of the elements of combustion.

A further object is to maintain the efficiency of combustion uniformly high, regardless of sudden and wide variations in rating.

Further objects will become evident from a study of the specification and of the drawings, in which:

Fig. 1 diagrammatically illustrates a drumless forced flow vapor generator to which the present invention is directed.

Fig. 2 diagrammatically illustrates a drumless forced flow vapor generator, combined with the requisite apparatus to control the functioning thereof, and such apparatus shown in partially diagrammatic fashion.

In the various drawings, identical parts bear the same reference numerals.

Figure 1:
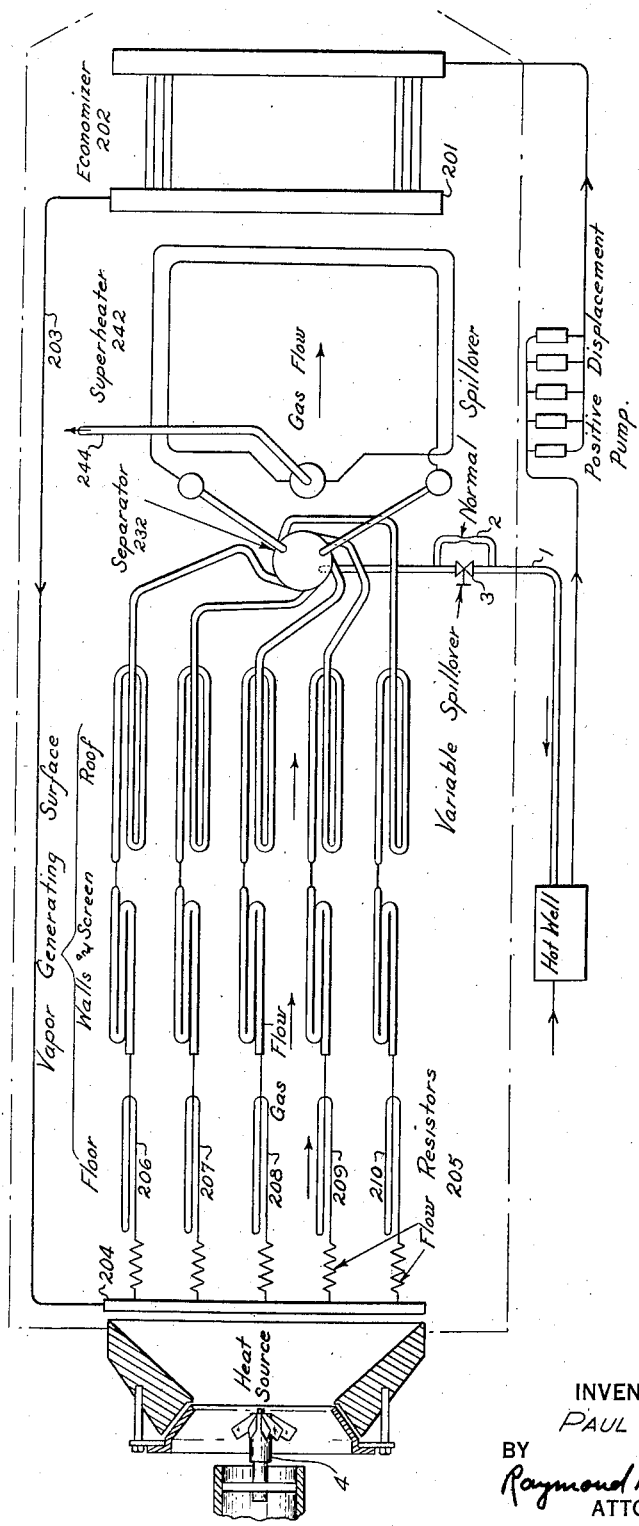

The drumless forced flow vapor generator to which the present invention is directed is diagrammatically illustrated in Fig. 1 to indicate gas flow, working fluid flow, and heat absorbing surface arranged as contained within the enclosure represented by the dot and dash lines.

The flow path for the working medium is comprised of long small-bore tubes brought together at suitable headers. The generator includes an economizer 202 at the cooler end of the gas passage and which receives liquid from a positive displacement pump as shown connected to the hot well.

The liquid from the economizer outlet header 201 is conveyed by a tube 203 to a manifold tube 204 from which the liquid is distributed to the generating section through in this instance, five fluid flow resistors 205, each of which has a greater resistance drop than the particular fluid flow passage which it serves and whereby the liquid is proportionately distributed to each of the tubular fluid flow passages 206, 207, 208, 209 and 210 constituting the generating section of the assembly, which comprises floor, wall, screen and roof portions as indicated.

These five flow circuits comprising the vapor generating surface tangentially enter a bulge in the fluid flow path which is in the form of a separating chamber 232 for dividing the fluid into liquid and vapor; the vapor passing to a superheater 242, and the excess liquid being diverted from the fluid flow path to a pipe 1 to the hot well or to waste. A normal continuous spillover occurs through the restriction 2 while a variable spillover occurs through the regulating valve 3.

The "heat source" (Fig. 1) includes a pulverized fuel burner 4 supplied by a pipe 5 (Fig. 2) and an air chamber 6 supplied by a secondary air conduit 7. In order to provide for initial ignition of the pulverized fuel firing means, a gas-firing device 8 is supplied by a pipe 9 with a flow of gas under the control of a solenoid actuated valve 10.

Figure 2:
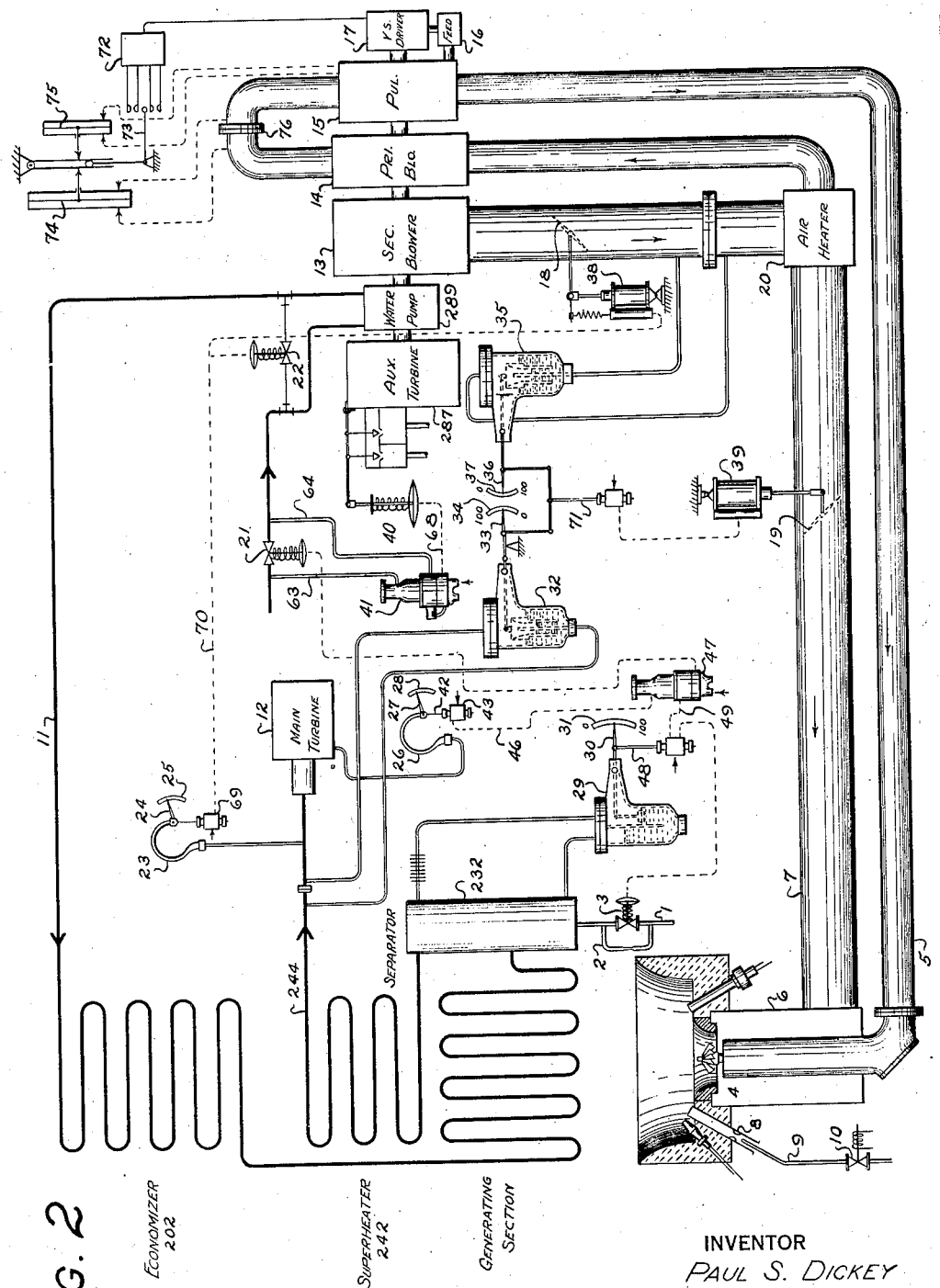

Referring now in particular to Fig. 2, I illustrate the fluid flow path as a single sinuous tube, to the economizer section 202 of which, liquid is supplied under pressure to a pipe 11 from a pump 289, which while it is illustrated in Fig. 1 as a positive displacement pump may be of any suitable type, and which I have therefore illustrated in Fig. 2 merely diagrammatically. From the economizer section the fluid passes to and through the generating section discharging into the separator 232. From the separator, vapor passes to and through the superheater 242, leaving by the conduit 244 to a main turbine 12 illustrative of a vapor consuming device. Products of combustion pass successively through the generating section, superheater, and economizer and may contact a part or all of the separator.

An auxiliary turbine 287 drives a liquid feed pump 289, the secondary air blower 13, the primary air blower 14, the pulverizing mill 15, and a fuel feeder 16, the latter under the control of a variable speed driver 17. While I have illustrated these devices diagrammatically and as though all are located to be driven by the same shaft and at the same speed, it will be understood that the necessary gear reduction, or driving connections between the several devices, are known and would be properly designed as to relative speed, power, etc., and that I merely intend to indicate that the auxiliary turbine 287 drives these devices simultaneously and in unison.

The rate of supply of pulverized fuel to the burner 4 is primarily controlled by the speed of the pulverizer 15, but is further regulated by the rate of feed of raw coal to be pulverized, going to the pulverizer 15 from the feeder 16. Variation in such rate of feed of raw coal is under the control of the variable speed device 17. The supply of fuel to the furnace is further influenced by the amount of primary air sweeping through the pulverizer 15 and this is in turn a function of the relative position of the damper 18 at the outlet of the secondary air blower and the position of the damper 19 in the secondary air conduit 7.

The rate of supply of air to support combustion is primarily determined by the speed of the secondary blower 13 and of the primary blower 14, but is further influenced by the position of the damper 18. The total air supplied for combustion is proportioned through the conduits 5 and 7, dependent upon the relative positions of the dampers 18 and 19. It will be noted that the air from the secondary blower 13 passes to the air heater 20 from where it divides, a part going as primary air to and through the primary blower 14 and the remainder under the control of the damper 19 going through the conduit 7 to the windbox 6 as secondary air.

The rate of supply of liquid under pressure through the conduit 11 is primarily controlled by the speed of the pump 289, but is further influenced through the positioning of a regulating valve 21 at the suction side of the pump and by a regulating valve 22 in a by-pass around the pump.

In the operation of such a vapor generator certain variables are measured, indicated, and utilized as the basis for automatically controlling the supply of liquid thereto and the supply of the elements of combustion to the heating furnace.

I indicate at 23 a pressure responsive device such as a Bourdon tube connected to the conduit 244 and having an indicator pointer 24 adapted to cooperate with an index 25 for advising the instantaneous value of the vapor outflow pressure.

As an indicator of generator output, or load upon the vapor generator, I provide a Bourdon tube 26 adapted to position an indicator pointer 27 relative to an index 28. The Bourdon tube 26 is connected by means of a capillary with the turbine 12 at a location such that the Bourdon tube will be sensitive to first stage shell pressure of the turbine, which pressure bears a substantially straight line relation to rate of steam flow. Thus the pointer 27 will indicate, relative to the scale 28, a reading representative of rate of flow of steam from the vapor generator and therefore an indication of output or load upon the generator.

29 represents means responsive to liquid level within the separator 232 and constitutes a pressure casing enclosing a mercury U-tube connected across the vertical elevation of the separator. A float is adapted to rise and fall with the surface of the mercury in one leg and to thus cause a positioning of a pointer 30 relative to an index 31 to advise the instantaneous value of liquid level within the separator.

A flow meter 32 is adapted to position an indicator 33 relative to an index 34 to advise the instantaneous value of the rate of vapor outflow from the vapor generator. A rate of flow meter 35 positions an indicator 36 relative to an index 37 to provide an indication of the rate of flow of air for combustion leaving the secondary air blower 13.

The flow meters 32 and 35 are of a known type such as is disclosed in the patent to Ledoux, No. 1,064,748. Such a meter is a differential pressure responsive device adapted to correct for non-linear relation between differential pressure and rate of flow, to the end that angular positioning of the pointer relative to its index is by increments directly proportional to increments of rate of flow. I illustrate by dotted lines within the flow meters the outline of the internal construction wherein is a liquid sealed bell having walls of material thickness and shaped as described and claimed in the above mentioned Ledoux patent.

I preferably primarily control the supply of liquid to the fluid flow path and the elements of combustion to the furnace, through variation in speed of the auxiliary turbine, utilizing the liquid inflow as the basis for such control. Realizing, however, the possible difference in characteristics of the pumps and blowers, as well as variations in conditions of operation, I provide readjusting means to supplement the primary control of the elements of combustion. For the air, such readjusting means comprises the damper 18 positioned at the outlet of the secondary air blower 13 by a pneumatic actuator 38. Also the damper 19 positioned in the conduit 7 by a pneumatic actuator 39. For the fuel the readjusting means comprises the variable speed driver 17 and its effect upon the raw coal feeder 16.

The speed of the auxiliary turbine is regulated through varying the opening of governor valves admitting steam to the turbine. Such steam for example may be low pressure steam from the exhaust of the main turbine 12 or extraction steam therefrom, or it may be high pressure steam direct from the vapor generator. A pneumatic actuator 40 positions the governor valves under the influence of an air loading pressure established by a standardizing relay 41 illustrated in detail at Fig. 6.

In order to regulate the liquid inflow (through variation in speed of the liquid pump) I preferably accomplish the regulation responsive to liquid inflow, vapor outflow, and level of liquid in the separator.

Figure 4:
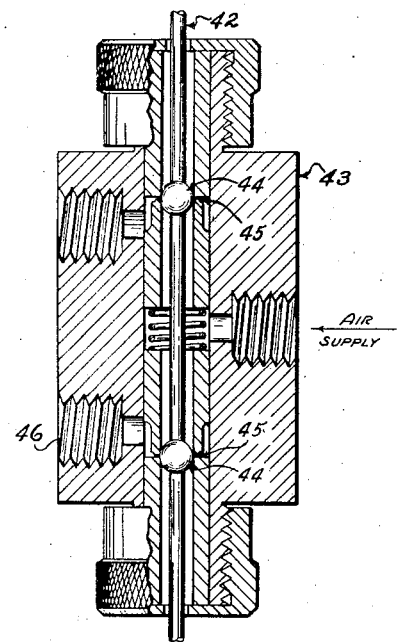
Fig. 4 is a sectional elevation of a pilot valve.

As previously mentioned, the Bourdon tube 26 is positioned responsive to turbine shell pressure representative of vapor outflow from the vapor generator and is adapted to vertically position a pilot stem 42 relative to a pilot casing 43, to which a supply of compressed air may be available as indicated by the small arrow. Such a pilot valve is shown in detail at Fig. 4 and forms the subject matter of a patent to Clarence Johnson No. 2,054,464.

Air under pressure is supplied to the interior of the casing 43 intermediate the pilot lands 44, which lands are so spaced along the stem 42 as to coincide with narrow annular ports 45. When the pilot stem is axially moved in the casing so that the lands 44 are moved relative to the ports 45, then a definite loading pressure is available in the annular ports bearing a known relation to the amount of such movement. For example, if the stem 42 is moved upwardly there is available at the upper left-hand exit of the casing 43 a loading pressure increasing in definite relation to such movement, while if the stem 42 is moved downwardly there is available at the lower left-hand exit a pressure increasing definitely with such movement.

I indicate pipes or capillaries for transmitting such air loading pressures, throughout the drawings, by dotted lines to distinguish from electrical connections, or other pipes or conduits. In Fig. 2 then, such a connection is illustrated at 46 for transmitting an air loading pressure bearing a known relation to rate of vapor outflow to a differential relay device 47. Such a differential relay is illustrated in detail at Fig. 5.

In similar manner the liquid level indicator 29 vertically positions a pilot stem 48 to establish at the relay 47, through the connection 49, an air loading pressure representative of liquid level.

Figure 5:
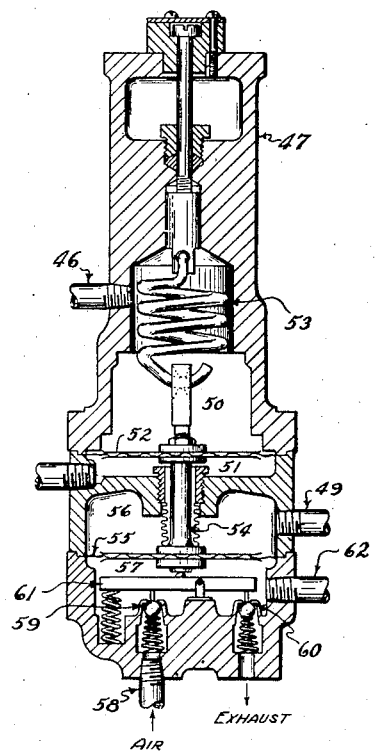
Fig. 5 is a sectional elevation of a pneumatic relay.

Referring to Fig. 5 the connection 46 leads to a chamber 50, separated by a diaphragm or movable partition 52 from a chamber 51 open to the atmosphere. The diaphragm 52 and loading spring 53 are both connected to a stem 54 to which is also attached a diaphragm 55, separating the chambers 56, 57. Connection 49 leads to the chamber 56. A supply of air under pressure is available through the connection 58 to the chamber 57 under the control of a valve 59. Exhaust from the chamber 57 to the atmosphere is under the control of a valve 60. The stem 54 is adapted to position a valve actuator 61 to either admit air under pressure through the valve 59, thus increasing the pressure within the chamber 57, or to bleed air to the atmosphere through the valve 60 and thus decrease the pressure within the chamber 57. Pressure within the chamber 57 is transmitted through a connection 62 to a spring loaded diaphragm actuator for positioning the valve 21 in the suction line to the liquid pump.

Certain features of the differential relay 47 are disclosed and claimed in my patent, 2,098,913.

It will be observed that variations in the loading pressure effective through the connection 46, or that effective through the connection 49, will be effective to vary the air pressure within the chamber 57 and correspondingly effective upon the positioning of the valve 21.

The valve 21 acts as a variable orifice across which there will exist a pressure differential bearing a known relation to the rate of flow of liquid through the valve 21. Pressures on opposite sides of the valve are effective through the pipes 63, 64 respectively in chambers 65, 66 of the standardizing relay 41.

Figure 6:
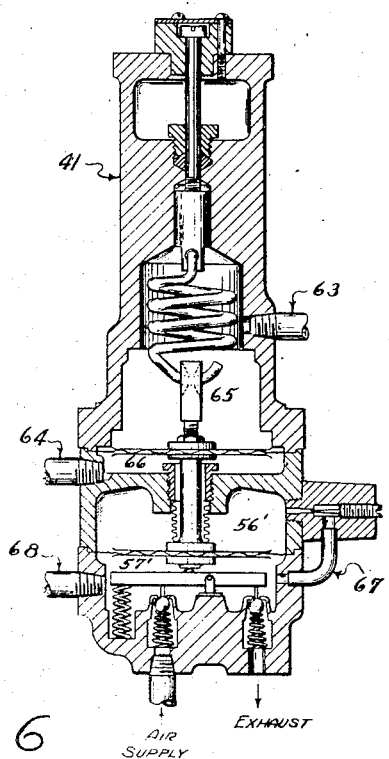
Fig. 6 is similar to Fig. 5 but embodies certain additional features of construction.

Referring now to Fig. 6 it will be observed that the standardizing relay 41 is to a certain extent similar to the relay 47, with the addition of a controllable bleed connection 67 between the chambers 56' and 57', certain features of which construction are disclosed and claimed in the patent to Harvard H. Gorrie, No. 2,098,914. A loading pressure established within chamber 57' is effective through a connection 68 upon the pneumatic actuator 40 for positioning the turbine governing valves. In this instance the function of the controllable bleed connection 67 is to supplement the primary control of the pressure effective upon the actuator 40 with a secondary control, of the same or different magnitude, as a follow-up or supplemental action to prevent over-travel and hunting, and wherein the positioning of the actuator 40 will not necessarily be directly with the positioning of the valve 21.

In general the valve 21 is positioned responsive to vapor outflow and to liquid level within the separator and forms a variable orifice in the suction line to the water pump. The device 41 receiving the differential pressure across the valve 21 positions the actuator 40 and the turbine governing valves to control the speed of the water pump in such manner that the differential pressure across the valve 21 will be held constant regardless of the opening of valve 21 and thus the liquid flow to the water pump is controlled proportional both to vapor outflow and to liquid level within the separator.

If vapor outflow increases, then the pilot stem 42 is raised proportionally, thus proportionally increasing the loading pressure effective through the connection 46, (to relay 47) causing a downward movement of the stem 54 and a corresponding opening of the valve 59 to additionally admit air under pressure within the chamber 57, thus increasing the air loading pressure through the connection 62 upon the valve 21, and increase the opening of the valve to allow a greater flow of water to the water pump commensurate with the increase in vapor outflow from the vapor generator.

Should the liquid level within the separator 232 tend to fall, the pilot stem 48 will be raised, thus increasing the loading pressure in the chamber 56 and in like manner further opening the valve 21 to increase the supply of liquid to the vapor generator.

It will then be observed that the valve 21 is positioned responsive to vapor outflow from the generator and to liquid level in the separator, while the speed of the water pump is not only responsive to these two variables but additionally to the rate of flow of water to and through the pump.

The liquid level responsive device 29 further controls, through the pilot stem 48, the positioning of the variable spillover valve 3 in such manner that upon a rise in liquid level within the separator 232 above a predetermined elevation there will be a regulated opening of the valve 3 to supplement the normal spillover 2 to the pipe 1.

Certain features of the control through the utilization of turbine shell pressure are disclosed and claimed in the co-pending application of Ralph M. Hardgrove, Serial No. 55,027, filed of even date herewith. Certain features directed to the control of the auxiliary turbine are disclosed and claimed in my co-pending application, Serial No. 55,026, filed of even date herewith. Certain features relating to multiple and sequential control from liquid level within the separator are disclosed and claimed in the co-pending joint application of Ervin G. Bailey and Paul S. Dickey, Serial No. 55,025, filed of even date herewith.

Under the control of vapor outflow pressure acting upon the Bourdon tube 23, I provide a pilot valve 69 for establishing an air loading pressure through the connection 70 to position the by-pass valve 22 and the damper 18. Upon a fall in vapor pressure from predetermined value the valve 22 and the damper 18 both tend to open, each from a predetermined position. This action is particularly desirable upon sudden material increases in load upon the unit as a whole, thus causing a marked decrease in vapor pressure. When such sudden and material increases in vapor outflow occur, thereby lowering the vapor pressure, the auxiliary turbine speed is increased and the damper 18 is opened. At such time it may be that momentarily the increase in speed of the water pump and correspondingly the liquid inflow to the vapor generator would be increased more than would be desired to utilize the available heat storage of the unit, and during such short intervals of time it is desired that a portion of the water pumped be by-passed from the outlet to the inlet side of the pump. The adjustment of the actuator 38 and of the actuator of the valve 22 is preferably such that they will be responsive only to predetermined variations in vapor pressure and correspondingly air loading pressure in the connection 70. For example, the damper 18 may be regulated as to position upon any departure of vapor pressure from predetermined value in either direction, while the valve 22 may be completely closed until vapor pressure has fallen a predetermined amount below the desired standard. Beyond that point the valve 22 would begin to open and the damper 18 may, or may not, be completely open while the opening of the valve 22 is being regulated.

I preferably primarily control the supply of the elements of combustion through varying the speed of the auxiliary turbine and thereby in unison with the rate of liquid inflow. I readjust the total supply of air to support combustion by the positioning of the damper 18 at the outlet of the secondary air blower responsive to variations in vapor outflow pressure.

I then proportion the air supplied through the conduit 7 to the vapor outflow from the generator. I accomplish this through the interaction of flow meters 32, 35 which co-act to position a pilot stem 71 for establishing an air loading pressure to which the actuator 39 is responsive.

The speed of the raw coal feeder 16 is controlled through the variable speed drive 17 from an electric contactor device 72. Herein is the means for increasing or decreasing the rate of feed of raw coal to the pulverizer. Such control is accomplished by movement of a contactor arm 73 under the joint control of two diaphragms 74, 75. Diaphragm 74 is acted upon by the differential pressure existing across an orifice 40 or other obstruction 76 in the air line from the primary air blower 14 to the pulverizer 15 and representative of the rate of flow of such air. Diaphragm 75 is subjected to opposing forces (a differential pressure existing across the pulverizer) representative of the flow of air and pulverized fuel through certain sections of the pulverizer.

The pressures acting upon the diaphragm 75 are proportional to the resistance drop through the pulverizer and are affected not only by the quantity of air flow through the orifice 76, and correspondingly through the pulverizer, but also influenced by the amount of unpulverized or partially pulverized fuel within the pulverizer. Thus if the rate of feed of raw coal to the pulverizer is greater than desired the amount of raw or partially pulverized fuel in the pulverizer will build up, thus varying the pressure drop across the pulverizer effective upon the diaphragm 75, which in turn actuates the contactor arm 73 to be effective upon the variable speed driver 17 to slow down the raw coal feeder 16. Conversely should the pressure drop effective upon the diaphragm 75 be less than desired relative to the pressure drop effective upon the diaphragm 74, then the contactor arm 73 will cause an increase in the rate of supply of raw coal through the feeder 16.

Figure 3:
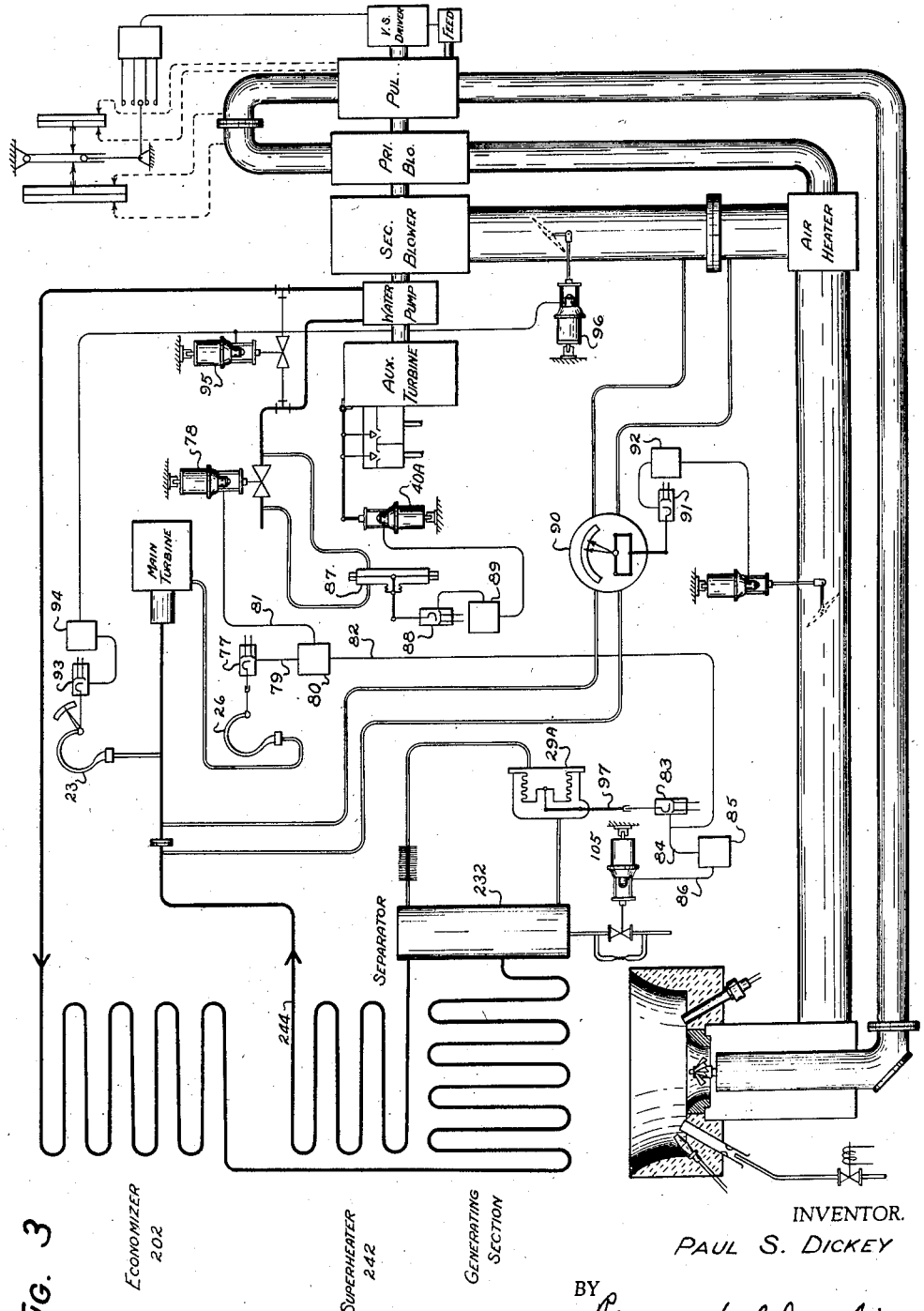
Fig. 3 is in general similar to Fig. 2 but comprising different apparatus for performing the method.

In Fig. 3 I illustrate an embodiment of my invention wherein I utilize electric means for carrying out the method, rather than the air actuated apparatus which I have described in connection with Fig. 2.

The Bourdon tube 26 positions a variable area electrode of an electron discharge device 77 for controlling the positioning of an actuator 78 at the valve 21. In the drawings a single line 79 connects the device 77 with a relay panel 80 which is in turn connected by the conductor 81 with the actuator 78 and by the conductor 82 with the device 83. The latter is connected by a conductor 84 with a relay panel 85. The device 83 is similar to the device 77 and is controlled by the water level responsive device 29A. From the relay panel 85 a conductor 86 joins the actuator 105 of the valve 3.

A pressure differential responsive device 87 is effective in positioning the movable element of an electron discharge device 88 connected to a relay panel 89 and from there connected with the actuator 40A. The ratio meter 90 combines the functions of the meters 32, 35 of Fig. 2 to compare the rate of vapor outflow and the rate of air flow through the conduit 7, and upon departure from predetermined relation between the two is adapted to move the movable electrode of an electron discharge device 91 connected to a relay panel 92 and to the actuator of the damper 19.

The conductors indicated at 79, 81, 82, 84, 86, etc., are meant to be cables which may have one or more wires, but the cables are shown as a single line to simplify the drawings.

The Bourdon tube 23 positions the movable electrode of an electron discharge device 93 which is connected through the relay panel 94 to the actuators 95 and 96.

Figure 7:
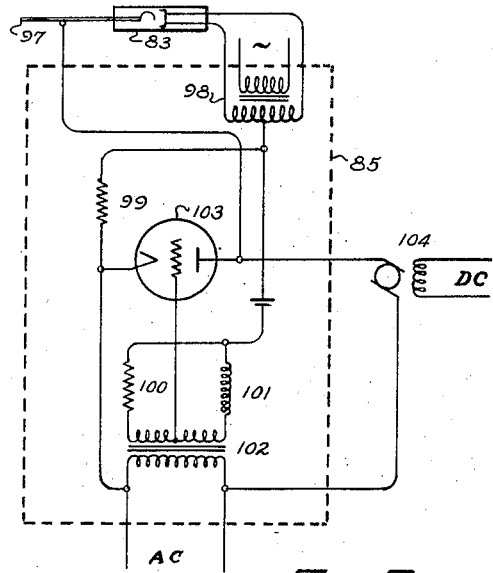
Figs. 7 and 8 are wiring details relating to Fig. 3.

Referring now to Fig. 7 I show the detailed wiring of a relay panel such as 85, 89, 92 and 94. Taking the panel 85 as representative, and referring to Fig. 7, it will be observed that the arm 97, positioned by the water level device 29A, is adapted to move the anode of the electron discharge device 83 relative to the cathode. In connection with the construction of said electron discharge device reference is made to the co-pending application of Elmer D. McArthur, Serial No. 23,194, filed May 24, 1935, and in connection with certain circuits including such a device reference is made to the patent to John D. Ryder No. 2,112,682.

The cathode of the device 83 is connected to the secondary of a heating transformer 98. 99 and 100 are resistances, 101 is an inductance, 102 a transformer, 103 an electron discharge device, and 104 a motor. The general purpose of the electron discharge device 103 is to control a flow of pulsating direct-current for speed control of the motor 104, which rotates in a single direction from zero to maximum speed dependent upon the current passage of the device 103.

The control of such current passage is through controlling the percentage of time of which the device 103 is allowed to conduct, and this by impressing upon the grid of the device 103 the sum of an AC and DC voltage. The AC voltage lagging in phase with respect to the plate voltage through the action of a phase shifting bridge 100, 101, 102 and therefore the point in the cycle at which the grid voltage reaches the threshold value, and allows the device 103 to conduct, may be varied by varying the magnitude of the DC voltage which is in series with the AC voltage. Such variation in magnitude of the DC voltage is accomplished through varying the effective area of the anode of the device 83 by mechanically moving the arm 97. Thus the speed of rotation of the motor 104, forming a part of the actuator 105, is varied through the positioning of the arm 97 by the level responsive device 29A.

Figure 8:
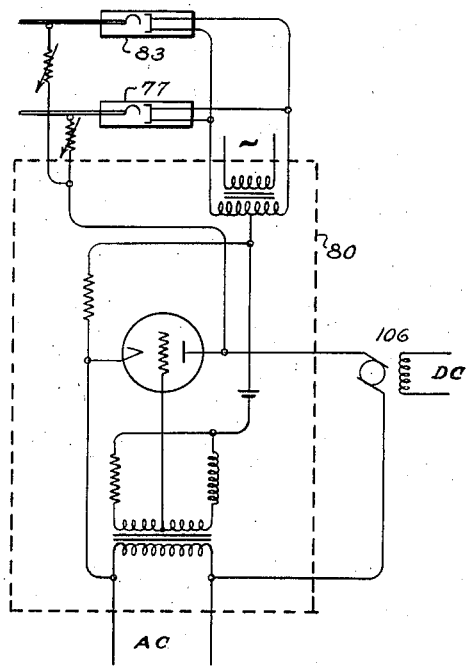

Fig. 8 illustrates the arrangement of relay panel 80 in connection with the electron discharge devices 83 and 77 which are connected in parallel to control the motor 106 of the actuator 78 jointly in response to vapor outflow and liquid level.

Figure 9:
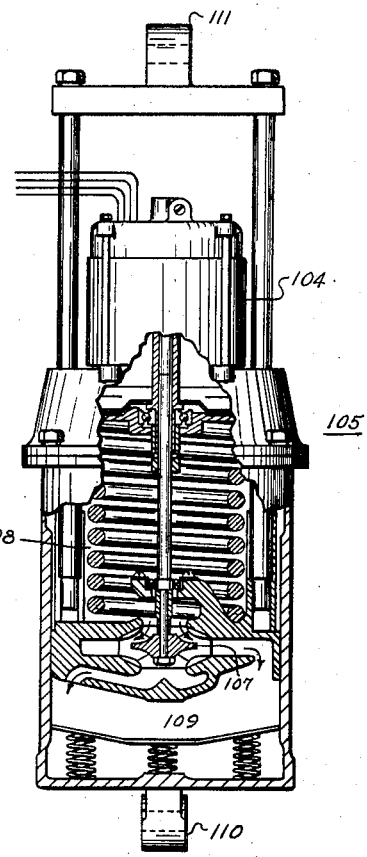
Fig. 9 is a sectional elevation of an operating mechanism of Fig. 3.

At Fig. 9 I illustrate a vertical elevation partially sectioned of the actuator 105, which is typical of the actuators 78, 95, 96, 40A, 105, etc. of Fig. 3. The motor 104 is the motor of the same number of Fig. 7 and is adapted to rotate in a single direction from zero to a minimum speed and at a speed varying with the current impressed across its armature, as clearly indicated in Figs. 7 and 8.

Rotation of the armature drives a fluid pump 107 forcing a fluid such as oil from the chamber 108, above the piston including the pump 107, to the chamber 109 below the piston. Such a transfer of fluid from one side of the piston to the other tends to move the piston upwardly and such motion is opposed by a compression spring in a manner clearly indicated. The pressure which is opposed by the spring varies with the speed of the motor 104 and if one end of the device, for example as at 110, is pivotally supported in a relatively fixed manner, then a change in the speed of the motor 104 results in a movement of the end 111 relatively toward or away from the end 110 and such movement, if applied to a valve or other device to be positioned, results in a positioning of such device.

It will, of course, be observed that by changing the direction of rotation of the pump 104 the spring opposing motion may be in tension rather than in compression. Furthermore such spring loading may be external of the device rather than internal.

While I have chosen to illustrate and describe certain preferred embodiments of my invention, it is to be understood that this is by way of illustration only and that I am not to be limited thereby except as to the claims in view of prior art.

What I claim as new, and desire to secure by Letters Patent of the United States, is:

1. The method of operating a vapor generator of the drumless forced flow type, which includes the steps of, controlling liquid inflow and the supply of fuel and air for combustion in accordance with load on the generator, readjusting air supplied from vapor outflow pressure, and further controlling the air supplied to maintain predetermined vapor outflow-air flow relation.

2. The method of operating a vapor generator of the drumless forced flow type, which includes the steps of, controlling liquid inflow and the supply of fuel and air for combustion in accordance with load on the generator, readjusting air supplied in accordance with vapor outflow pressure, and proportioning the air in two streams to the furnace in accordance with rate of vapor outflow and rate of total air flow.

3. The method of operating a vapor generator of the drumless forced flow type, which includes the steps of, controlling the supply of pulverized fuel and air for combustion in accordance with load on the vapor generator, readjusting total air supply from vapor outflow pressure, and dividing total air supply into a primary air stream and a secondary air stream, such division responsive to vapor outflow-total air flow relation.

4. An auxiliary power unit for a vapor generator, comprising in combination, a liquid supply pump, a secondary air blower, a primary air blower, a fuel pulverizer, a raw fuel feeder to the pulverizer, and a power means adapted to drive all of said devices in unison and responsive to a variable in the operation of the vapor generator.

5. In combination, a vapor generator, a pulverizer for supplying pulverized fuel to the furnace of the vapor generator, an air blower for supplying air to support combustion of the pulverized fuel, a regulator for controlling the pulverizer and blower and responsive to a variable in the operation of the vapor generator, means for dividing the air supply to provide a primary air stream to act as a carrier for pulverized fuel, and means responsive to vapor outflow and to total air flow for controlling said last named means.

6. In combination, a vapor generator having fuel supply means and air supply means, a meter of the vapor outflow, a meter of the air supplied, said meters coacting to establish an air loading pressure representative of vapor outflow-air flow relation, and means dividing said total air supply into two streams and controlled by said air loading pressure.

7. In combination, a vapor generator of the drumless forced flow type having a separator between the generating and superheating portions of the fluid flow path, a liquid supply pump, an air supply blower, and a fuel pulverizer; power means for driving said pump, blower, and pulverizer in unison; and regulating means for said power means responsive to variations in liquid level in said separator.

8. The combination with a vapor generator of the drumless forced flow type receiving liquid under pressure at one end and delivering superheated vapor at the other, means controlling liquid inflow and the supply of fuel and air for combustion responsive to an indication of load on the generator, means readjusting air supply responsive to an indication of vapor outflow pressure, and further means readjusting air supply to maintain predetermined vapor outflow-air flow relation.

9. In combination, a vapor generator of the drumless forced flow type having a separator between the generating and superheating portions of the fluid flow path, a turbine adapted to operate liquid and fuel and air supplying means for the vapor generator in unison, a regulating valve in the liquid supply line, means jointly responsive to an indication of generator load and to liquid level in the separator for positioning said valve, means sensitive to pressure differential across said valve, and speed governing mechanism for the turbine under the control of said last named means.

10. The combination with a vapor generator, of a liquid supply pump, an air supply blower, and a fuel supply means; power means for driving said pump, blower, and fuel supply means in unison and responsive to a variable in the operation of the vapor generator; a by-pass around the liquid supply pump, and means responsive to a variable condition of the vapor generated adapted to simultaneously control the opening of said by-pass and to regulate total air supply.

11. The combination with a vapor generator, of a liquid supply pump, an air supply blower, and a fuel supply means; power means for driving said pump, blower, and fuel supply means in unison and responsive to a variable in the operation of the vapor generator; a by-pass around the liquid supply pump, and means responsive to vapor outflow pressure adapted to simultaneously control the opening of said by-pass and to regulate total air supply.

12. The combination with a vapor generator, of a liquid supply pump, an air supply blower, and a fuel supply means; power means for driving said pump, blower, and fuel supply means in unison and responsive to a variable in the operation of the vapor generator; a by-pass around the liquid supply pump, means responsive to a variable condition of the vapor generated adapted to simultaneously control the opening of said by-pass and to regulate total air supply, and means dividing the total air supplied into two streams responsive to vapor outflow-air flow relation.

13. The combination with a vapor generator, of a liquid supply pump, an air supply blower, and a fuel supply means; power means for driving said pump, blower, and fuel supply means in unison and responsive to a variable in the operation of the vapor generator; a by-pass around the liquid supply pump, and means responsive to vapor outflow pressure adapted to simultaneously control the opening of said by-pass and to regulate total air supply, and means dividing the total air supplied into two streams responsive to vapor outflow-air flow relation.

14. An auxiliary power unit for a vapor generator, comprising in combination, a liquid supply pump, a secondary air blower, an air blower for primary air for supplying fuel to the generator, fuel preparation and supply means, and a power means adapted to drive all of said devices in unison and responsive to a variable in the operation of the vapor generator.

15. An auxiliary power unit for a vapor generator, comprising in combination, a liquid supply pump, a secondary air blower, an air blower for primary air for supplying fuel to the generator, solid fuel supply means, and a power means adapted to drive all of said devices in unison and responsive to a variable in the operation of the vapor generator.

16. In combination, a vapor generator having fuel supply means and air supply means, a meter of the vapor outflow, a meter of the air supply, said meters coacting to establish an air loading pressure representative of vapor outflow-air flow relation, and means dividing said total air supply into a plurality of streams and controlled by said air loading pressure.

17. In combination, a vapor generator of the drumless forced flow type having a separator between the generating and superheating portions of the fluid flow path, a turbine adapted to operate liquid and fuel and air supplying means for the vapor generator in unison, an adjustable orifice in the liquid supply line, means jointly responsive to an indication of generator load and to liquid level in the separator for positioning said orifice, means sensitive to pressure differential across said orifice, and speed governing mechanism for the turbine under the control of said last named means.

PAUL S. DICKEY.